United States Patent
Davis et al.

(10) Patent No.: US 6,168,867 B1
(45) Date of Patent: Jan. 2, 2001

(54) OUTER LAYER FOR FUSER MEMBER HAVING AN ARYL SILANE CROSSLINKING AGENT

(75) Inventors: Stephen V. Davis, Rochester; Jiann H. Chen, Fairport; Joseph M. Szostek, Rochester, all of NY (US)

(73) Assignee: NexPress Solutions LLC, Rochester, NY (US)

( * ) Notice: Under 35 U.S.C. 154(b), the term of this patent shall be extended for 0 days.

This patent is subject to a terminal disclaimer.

(21) Appl. No.: 09/205,125

(22) Filed: Dec. 3, 1998

(51) Int. Cl.⁷ .............................. B32B 15/08; G03G 15/20
(52) U.S. Cl. ...................... 428/450; 399/333; 428/36.91; 428/448; 430/124; 492/56; 492/59
(58) Field of Search .................... 428/35.8, 36.9, 428/36.91, 448, 450; 492/56, 59; 399/333; 430/124

(56) References Cited

U.S. PATENT DOCUMENTS

| | | | |
|---|---|---|---|
| 4,659,621 | 4/1987 | Finn et al. | 428/339 |
| 5,035,950 | 7/1991 | Del Rosario | 428/421 |
| 5,166,031 | 11/1992 | Badesha et al. | 430/124 |
| 5,269,740 | 12/1993 | Fitzgerald et al. | 492/56 |
| 5,292,562 | 3/1994 | Fitzgerald et al. | 428/35.8 |
| 5,292,606 | 3/1994 | Fitzgerald | 428/35.8 |
| 5,336,539 | 8/1994 | Fitzgerald | 428/36.8 |
| 5,474,821 | 12/1995 | Kass | 428/35.8 |
| 5,480,724 | 1/1996 | Fitzgerald et al. | 428/447 |
| 5,753,361 | 5/1998 | Visser | 428/323 |

*Primary Examiner*—D. S. Nakarani

(57) ABSTRACT

A fuser member having a support metallic core and an outer layer of material formed over the metallic core, the outer layer including composite material, including a silicone T-resin; a crosslinked poly(dialkylsiloxane), wherein the poly(dialkylsiloxane) has a weight average molecular weight before crosslinking of about 5,000 to 80,000; and an aryl silane crosslinking agent.

13 Claims, 2 Drawing Sheets

OUTER LAYER FOR FUSER MEMBER HAVING AN ARYL SILANE CROSSLINKING AGENT

CROSS REFERENCE TO RELATED APPLICATION

Reference is made to commonly assigned U.S. patent application Ser. No. 09/204,598, filed Dec. 3, 1998, entitled "Fuser Member Having Composite Material Including Silicone T-Resin" by Szostek et al, and U.S. patent application Ser. No. 09/204,601, filed Dec. 3, 1998, now U.S. Pat. No. 5,960,245, issued Sep. 28, 1999, entitled "Oil Swell Controlling Fuser Member Having a Silicone T-Resin" by Chen et al, the teachings of which are incorporated herein by reference.

FIELD OF THE INVENTION

The present invention relates to the field of fuser members useful in electrophotographic copying.

BACKGROUND OF THE INVENTION

A widely used method for affixing toner materials to a receiver sheet is by the application of high temperature and pressure in the fusing subsystem of a photocopying machine. A common configuration for a fusing subsystem is to place a pair of cylindrical rollers in contact. The roller that contacts the side of the receiver sheet carrying the unfixed or unfused toner is known as the fuser roller. The other roller is known as the pressure roller. The area of contact is known as the nip.

A toner receiver sheet containing the unfixed or unfused toner is passed through the nip. A soft coating on one or both of the rollers allows the nip to increase in size relative to the nip which would have been formed between two hard rollers and allows the nip to conform to the receiver sheet, improving the fusing quality. Typically, one or both of the rollers are heated, either through application of heat from the interior of the roller or through external heating. A load is applied to one or both rollers in order to generate the higher pressures that are necessary for good fixing or fusing of the toner to the receiver sheet.

The application of high temperature and pressure as the receiver sheet passes through the nip causes the toner material to flow to some degree, increasing its contact area with the receiver sheet. If the cohesive strength of the toner and the adhesion of the toner to the receiver sheet is greater than the adhesion strength of the toner to the fuser roller, complete fusing occurs. However, in certain cases, the cohesive strength of the toner or the adhesion strength of the toner to the receiver is less than that of the toner to the fuser roller. When this occurs, some toner will remain on the roller surface after the receiver sheet has passed through the nip, giving rise to a phenomenon known as offset. Offset can also occur on the pressure roller.

Offset is undesirable because it can result in transfer of the toner to non-image areas of succeeding copies and can lead to more rapid contamination of all machine parts in contact with the fusing rollers and to increased machine maintenance requirements. It can also lead to receiver (paper) jams as the toner-roller adhesion causes the receiver sheet to follow the surface of the roller rather than being released to the post-nip paper path.

It is common in some machines to apply release oil externally to the roller in the machine as it is being used. The release oil is typically poly(dialkylsiloxane) (PDMS) oil. PDMS oil does an excellent job in its role as release agent; however, there are associated disadvantages.

The release agent can be spread to other parts of the machine, causing contamination. Further, streaks may appear in the image as a result of imperfect spreading of the release agent across the roller surface. Therefore, it is desirable to improve the release performance of the roller materials in order to be able to minimize the amount of release agent that must be applied to the roller.

The release agent's compatibility with PDMS-based roller materials result in swelling of the rollers. This swelling cannot be easily compensated for, since it is generally non-uniform. Paper passing over the rollers can wick away some of the release oil within the paper path, resulting in a differential availability of the release oil to roller areas within and outside the paper path. This causes differential swell of the roller inside and outside the paper path so that a "step pattern" is formed in the roller. This can cause problems when different size papers are used and can lead to increased wear and decreased roller life as described in U.S. Pat. No. 5,753,361. This wear can also lead to an uneven pressure distribution between the two rollers of the fusing assembly resulting in poor print quality as described in U.S. Pat. No 5,035,950 and as is well known in the art. Another associated problem is the tendency of a silicone layer to soften as it swells with the polydimethylsiloxane release fluids and its subsequent debonding as described in U.S. Pat No. 5,166,031. Here the suggested solution to the problems of the silicone fuser member coating was to develop fluoroelastomer analogs to replace the silicone. However, the toner's tendency to offset is sacrificed.

In applications using a donor roller oiling system, the use of a silicone based outer layer and its subsequent swell by the polydimethylsiloxane release fluid results in excessive swelling leading to failure of the roller to provide a uniform layer of release fluid as described in U.S. Pat. No. 4,659,621. As disclosed, the silicone fuser member coating included fluoroelastomer analogs replacing silicone. However, the toner's tendency to offset was sacrificed.

There continues to be a need for improved fuser and pressure rollers with improved fusing performance, e.g. reduced impact of swell on wear resistance without reducing the toner releasability. The impact of oil swell on wear is measured as the difference between the oil swollen wear and the dry wear.

SUMMARY OF THE INVENTION

It is an object of the present invention to provide an improved fuser member with improved release and improved wear resistance properties and including a reduction in oil swell and the effect of oil swell on wear.

In accordance with the present invention there is provided a fuser member having a support metallic core and an outer layer of material formed over the metallic core, the outer layer including composite material, comprising:

(a) a silicone T-resin;

(b) a crosslinked poly(dialkylsiloxane), wherein the poly (dialkylsiloxane) has a weight average molecular weight before crosslinking of about 5,000 to 80,000; and (c) an aryl silane crosslinking agent.

An advantage of the present invention is that by reducing the oil swell of the fuser member wear resistance of the roller can be improved resulting in a longer useful life.

Another advantage of the current invention is that the reduction of oil swell results in the advantages listed above without sacrificing any of the release characteristics thereby reducing the quantity of release agent that is needed.

DETAILED DESCRIPTION OF THE PREFERRED EMBODIMENT

Figure 1:
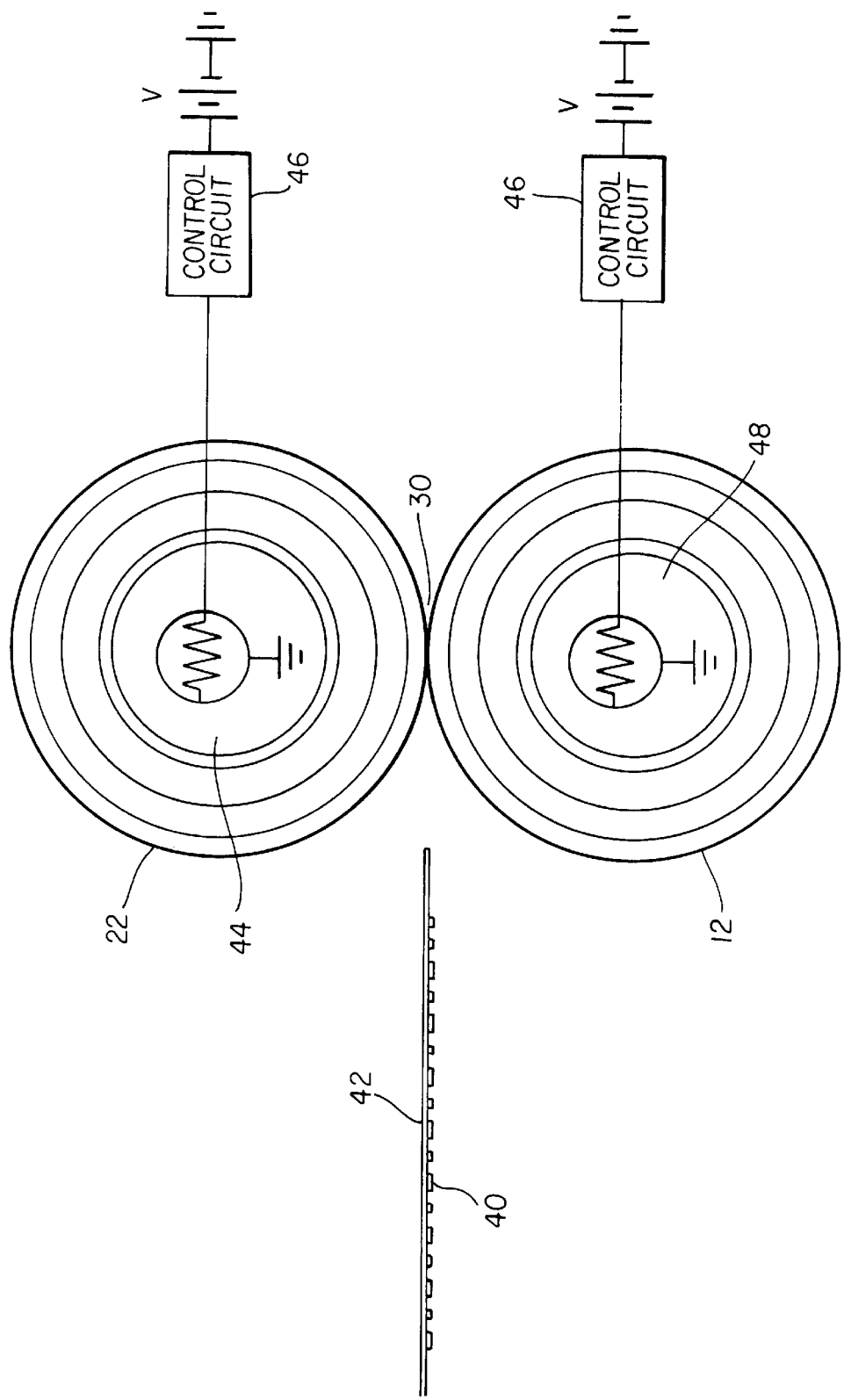
FIG. 1 is a cross-sectional view of a fusing assembly including a fuser roller and a pressure roller.

Turning first to FIG. 1, there is shown a fusing assembly 8 which includes a fusing member, shown as fuser roller 12 and another fusing member, shown as a pressure roller 22. The fuser roller 12 is heated either internally with a heating lamp 48 controlled by control circuit 46 driven by a power supply shown as battery B. The pressure roller 22 may or may not be likewise heated by either internally with a heating lamp 44 controlled by another control circuit 46. In place of using an internal heating element the exterior surface of fuser roller 12 and pressure roller 22 can be heated. The fuser roller 12 and pressure roller 22 come together under pressure to form a nip 30. The receiver sheet 42 with unfused toner 40 pass through the nip 30 to fuse the toner 40 to the receiver sheet 42.

Figure 2:
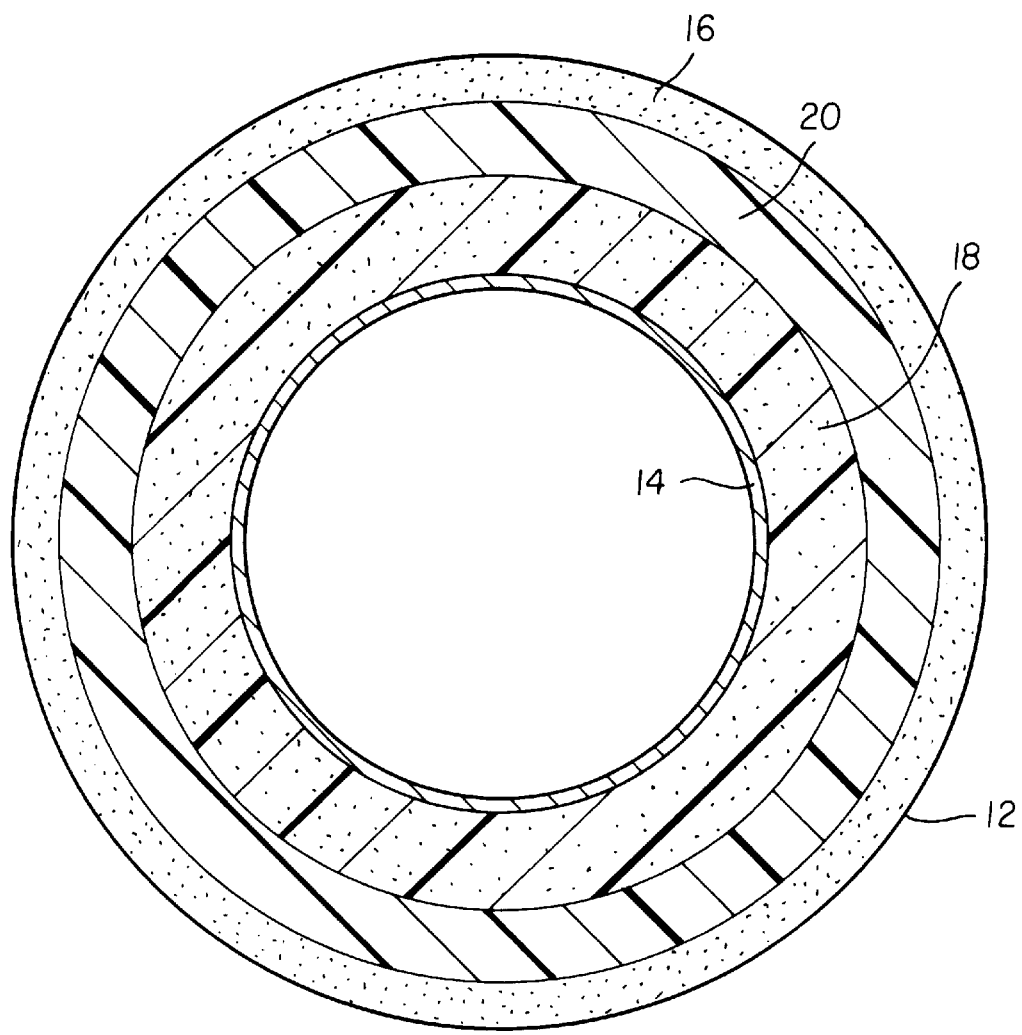
FIG. 2 is a cross-sectional view of the fusing member of FIG. 1.

In FIG. 2, there is shown a fusing member 10 which is in the form of a roller such as fuser roller 12. Also, the pressure roller 22 can have the same or similar configuration as shown in FIG. 1. The fuser roller 12 includes a metallic core 14 which is preferably formed of an aluminum shaft which is connected to a gudgeon (not shown) which has a thermal conductivity lower than the metallic core 14. Disposed over the metallic core 14 is an outer layer 16. The outer layer 16 includes a silicone T-resin and other materials which will be discussed later. As shown it may be preferable to include intermediate layers between the metallic core 14 and the outer layer 16. In the embodiment shown there is a cushion layer 18 formed on the metallic core 14 and another intermediate barrier layer 20 formed between the outer layer 16 and the cushion layer 18.

In practice the cushion layer 18 and the intermediate layer 20 may be omitted. When present both layers would be formed of a temperature resistant material. When fusing member 10 is a fusing roller (12 in FIG. 1), it can be desirable for the cushion layer 18 to be thermally conductive such a metal oxide filled silicone elastomer. In the case of the fusing member 10 being a pressure roller (22 in FIG. 1) it can be desirable for the cushion layer 18 to be of low thermally conductivity such as a silicon oxide filled silicone elastomer.

In either application, the other intermediate layer 20 can be either to control surface finished or to act as an adhesion promotion or oil barrier layer. The fusing member 10 of the present invention can be either the fuser roller 12, as defined above, or the pressure roller 22 also as defined above.

The outer layer 16 of the fusing member 10 of the invention includes a crosslinked poly(dialkylsiloxane). The filler is a silicon T-resin which is added to the crosslinkable poly(dialkylsiloxane).

Silanol-terminated poly(dialkylsiloxane) polymers and methods of their preparation are well known. They are readily commercially available, e.g., from Huls America, Inc., (United Chemical) 80 Centennial Ave., Piscataway, N.J., U.S.A., and have the structure:

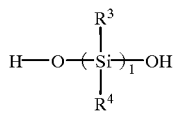

Structure (1)

For purpose of the present invention, 1 is an integer such that the Structure (1) polymer has a weight average molecular weight of from 5,000 to 80,000. $R^3$ and $R^4$ are independently alkyl groups such as methyl, ethyl, propyl, butyl, pentyl, or hexyl. If the molecular weight were below 5,000, the final crosslinked poly(dialkylsiloxane) would have a high crosslink density that would make the material too hard and brittle, and not resilient enough to serve practically in a base cushion layer. If the molecular weight were above 80,000, the final crosslinked poly(dialkylsiloxane) would be too unstable under conditions of high temperature and cyclic stress (i.e., there would be too much creep and change in hardness over time).

The poly(dialkylsiloxane) polymers can be crosslinked with one or more multifunctional aryl silanes. The multifunctional aryl silanes that can serve as crosslinking agents for the Structure (1) polymers are well known for this purpose. Each of such aryl silanes comprises a silicon atom bonded to at least one group that are functional to condense with the hydroxy end groups of the Structure (I) polymers to thereby create siloxane crosslinks through the silicon atom of the silane. The silane crosslinking agent has at least one aryl group and has the formula:

$$R^1{}_n Si(OR^2)_{4-n};$$

$$R^1{}_n R^3{}_m Si(OR^2)_{4-n-m};$$

Or $$R^1{}_n SiX_{4-n}$$

where $R^1$ is aryl and $R^2$ and $R^3$ are independently aryl or alkyl, X is a halide or hydrogen, n and m are integers such that the sum is less than or equal to 4. At least one aryl silanes must comprise a silicon atom bonded to at least three groups that are functional to condense with the hydroxy end groups of the Structure (1) polymers to thereby create siloxane crosslinks through the silicon atom of the silane Appropriate aryl silanes include diphenyldiethoxysilane, diphenyldiacetoxtsilane, diphenyldichlorosilane, 2-(diphenylphosphino)ethyltriethoxysilane, triphenylmethoxysilane, diphenylsilane, phenyltriethoxysilane, diphenylmethylethoxysilane, N-phenylaminopropyltrimethoxysilane, phenethyltris (trimethoxysiloxy)silane, phenyltrichlorosilane, phenyltrimethoxysilane and diphenyltrimethoxysilane.

The condensation crosslinking reaction is generally carried out with the aid of a catalyst, such as, for example, a titanate or silicate, chloride, oxide, or carboxylic acid salt of zinc, tin, iron, or lead. Some specific examples of suitable catalysts are zinc octoate, dibutyltin diacetate, ferric chloride, and lead dioxide.

The primary crosslinkable poly(dialkylsiloxane) resin used for the Examples is Dow Corning DC3-0133, which is composed of a network-forming polymer that is a silanol-terminated (α-ω-hydroxy-) poly(dimethyl siloxane) (PDMS). The number of repeat units is such that the silanol-terminated PDMS (α-ω-dihydroxypolydimethyl siloxane) has a weight average molecular weight of from 5,000 to 80,000. Specific examples of useful catalysts for this polymer are dibutyltin diacetate, tin octoate, zinc octoate, dibutyltin dichloride, dibutyltin dibutoxide, ferric chloride, lead dioxide, or mixtures of catalysts such as CAT50®, (sold by Grace Specialty Polymers, Massachusetts). CAT50® is believed to be a mixture of dibutyltin dibutoxide and dibutyltin dichloride diluted with butanol.

The second component of the outer layer 16 is a silicone T-resin. A silicone T-resin as described in United Chemical catalog (page 280 5$^{th}$ edition) is a highly crosslinked material with the empirical formula (or repeat unit) $RSiO_{1.5}$ formed from polymerization of silsesquioxane monomers to form by nature an unordered structure. R can be any alkyl or aryl group including but not limited to methyl, phenylpropyl, phenyl, or phenylvinyl. The term "unordered structure" means that the organization of repeat units is substantially random. An example structure for a such formed silicone T-resin is shown below where ? represents a repeat unit.

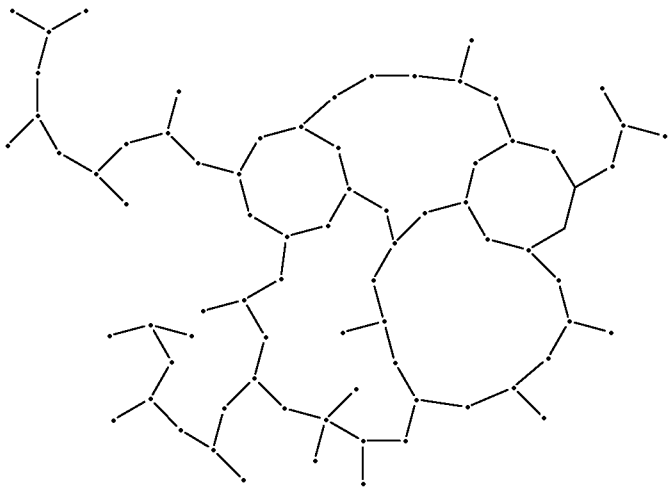

For the preferred embodiment, the various components of the composite material can have the following weight percentages:
(a) 10–60 wt % α-ω-hydroxy-poly(dialkylsiloxane)
(b) 5–50 wt % aryl silane crosslinking agent;
(c) 26–100 parts per 100 parts polymer silicone T-resin; and
(d) 0.05–2 wt % catalyst.

To form the layer of a fusing member 10 in accordance with the invention, the poly(dialkylsiloxane) resin, the silicone T-resin, the aryl silane are mixed with a 3 roll mill, propellor mixer, or similar device. A catalyst is present in an amount sufficient to solidify the composite material within a time suitable for manufacturing parts yet maintaining a sufficiently low molecular weight to facilitate processing. The catalyst is then added to the mixture and with thoroughly stirred. The mix is then degassed and injected into a mold surrounding the fusing member 10, e.g. roll, core to mold the material onto the core. The covered core remains in the mold for a time sufficient for some crosslinking to occur (e.g., 4 hours). The covered roll is then removed from the mold and heated to accelerate the remaining crosslinking.

Preferably, outer layer 16 is applied over a support which has been conversion coated and primed with metal alkoxide primer in accordance with commonly assigned U.S. Pat. No. 5,474,821.

If the material of this invention is coated over another coating layer, one or more methods of layer-to-layer adhesion improvement, such as corona discharge treatment of the other coating layer's surface, may be applied prior to application of the material of this invention. Various methods of layer-to-layer adhesion improvement are well known to one skilled in the art.

An oil-barrier layer can be used under the outer layer 16. It can be formed by coating an underlying silicone elastomer, coated directly or indirectly on a cylindrical core, with a composition formed by compounding a mixture comprising a fluorocarbon copolymer, a fluorocarbon-curing agent, a curable polyfunctional poly($C_{(1-6)}$alkyl) phenylsiloxane polymer, one or more fillers and an accelerator for promoting crosslinking between the curing agent and the fluorocarbon copolymer. Other candidates for oil barrier layer include most heat resistant non oil swelling materials.

The roller core, usually cylindrical in shape, can be composed of any rigid metal, ceramic, or plastic substance. The material should have sufficient ductility to avoid breakage of the core during normal maintenance and operation of an electrophotographic machine. Metal cores are preferred if the roller is to be internally heated because of the high thermal conductivity of metal. Suitable core materials can include aluminum, stainless steel, metal alloys, ceramic materials, combinations of ceramic and polymeric materials, and polymeric materials such as thermoset resins with or without reinforcing additives.

The thicknesses of the outer layer 16 of the invention and any other layers present, e.g. cushion layers and the like, can provide the desired resilience to the fusing member 10, and the outer layer 16 can flex to conform to that resilience. The thickness of the base cushion and outer layers will be chosen with consideration of the requirements of the particular application intended. Usually, the outer layer 16 would be thinner than the base cushion layer 18. For example, base cushion layer 18 thicknesses in the range from 0.5 to 6.0 mm have been found to be appropriate for various applications.

The release fluid is continuously coated over the surface of the fusing member 10 in contact with the toner image. The fusing member 10 of the invention can be used with polydimethylsiloxane or functionalized polydimethylsiloxane release oils at normally used application rates or at reduced application rates, generally but not limited to about 0.5 mg/copy to 10 mg/copy (the copy is 8.5 by 11 inch 20 pound bond paper).

The rolls produced in accordance with the present invention are thus useful in electrophotographic copying machines to fuse heat-softenable toner to a substrate. This can be accomplished by contacting a receiver, such as a sheet of paper, to which toner particles are electrostatically attracted in an imagewise fashion with such a fusing member 10. Such contact is maintained at a temperature and pressure sufficient to fuse the toner to the receiver.

EXAMPLES

The following examples are presented for a further understanding of the invention.

Example 1

100 parts DC3-0133 was blended with 50 parts GE Tospearl 145 spherhical fine white powder on a 3 roll mill. 10 parts of phenyltrimethoxysilane was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 2

100 parts DC3-0133 was blended with 75 parts GE Tospearl 145 spherhical fine white powder on a 3 roll mill. 10 parts of phenyltrimethoxysilane was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Example 3

100 parts DC3-0133 was blended with 100 parts GE Tospearl 145 spherhical fine white powder on a 3 roll mill. 10 parts of phenyltrimethoxysilane was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 1

100 parts DC3-0133 was blended with 25 parts GE Tospearl 145 spherhical fine white powder on a 3 roll mill. 10 parts of phenyltrimethoxysilane was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 2

100 parts DC3-0133 was blended with 50 parts GE Tospearl 145 spherhical fine white powder on a 3 roll mill. 10 parts of tetraethylorthosilicate was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 3

100 parts DC3-0133 was blended with 75 parts GE Tospearl 145 spherhical fine white powder on a 3 roll mill. 10 parts of tetraethylorthosilicate was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 4

100 parts DC3-0133 was blended with 100 parts GE Tospearl 145 spherhical fine white powder on a 3 roll mill. 10 parts of tetraethylorthosilicate was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 5

100 parts DC3-0133 was blended with 50 parts GE Tospearl 145 spherhical fine white powder on a 3 roll mill. 10 parts of propyltrimethoxysilane was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 6

100 parts DC3-0133 was blended with 75 parts GE Tospearl 145 spherhical fine white powder on a 3 roll mill. 10 parts of propyltrimethoxysilane was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 7

100 parts DC3-0133 was blended with 100 parts GE Tospearl 145 spherhical fine white powder on a 3 roll mill. 10 parts of propyltrimethoxysilane was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Comparative Example 8

100 parts DC3-0133 was blended with 50 parts ZnO powder (1–5 micron) on a 3 roll mill. 10 parts of phenyltrimethoxysilane was stirred into the mixture. CAT50® catalyst was added at the rate of one part of catalyst to 200 parts by weight DC3-0133. The mixture was degassed and molded in the shape of a 90 mil×6 inch×6 inch slab. The slab was air cured 12 hours at 25° C. then demolded. The slab was the cured with a 12 hour ramp to 200° C. followed by an 18 hour hold at 200° C. The slab was then subjected to testing as will be described in more detail later.

Material Testing

Swell

Oil swell was measured by immersing a weighed sample in 350 cts Dow Corning DC200 polydimethylsiloxane for 7 days at 175° C. and calculating the weight Wear The wear rate test of molded slabs was performed using a Norman Abrader Device (Norman Tool Inc., Ind.). For this test, the Abrader Device was modified by replacing the standard grommet wheel with an aluminum rod (1.1 inch in length and 0.625 inch in diameter), placing a renewable paper strip on the samples, and running the tests at about 350° F. Four hundred eighty (480) cycles were accumulated with a 1 kg load on a 9/16 inch wide sample. The depth of the wear track was then measured on a Federal 2000 Surfanalyzer using a chisel tip at 25 mm/min, Oil wear The wear test above was performed on a sample which had be soaked in 350 cts polydimethylsiloxane oil at 175° C. for 7 days.

Toner Release Test

The test samples are employed to evaluate the toner offset and release force characteristics of the fuser member coating. Two samples are cut approximately 1-inch square of each example. One of these squares is left untreated by release agent (the dry sample). To the surface of the other sample is applied in unmeasured amount of 350 cts polydimethysiloxane (the oil sample).

Each sample was incubated overnight at a temperature of 175° C. Following this treatment, the surface of each sample was wiped with dichloromethane. Each sample was then soaked in dichloromethane for one hour and allowed to dry before off-line testing for toner offset and release properties.

Each sample was tested in the following manner:

A one-inch square of paper covered with unfused polyester toner is placed in contact with a sample on a bed heated to 175° C., and a pressure roller set for 80 psi is locked in place over the laminate to form a nip. After 20 minutes the roller was released from the laminate.

The extent of offset for each sample was determined by microscopic examination of the sample surface following delamination. The following numerical evaluation, corresponding to the amount of toner remaining on the surface, was employed.

1 0% offset
1–2 0–20% offset
2–3 20–50% offset
3–4 50–90% offset
4–5 90–100% offset Qualitative assessment of the force required for delamination of the paper from the sample was as follows:

1 low release force
2 moderate release force
3 high release force

The results are shown in the following table

| Sample | swell (%) | Wear (mils) | Oil Wear (mils) | Dry Release/Offset | Oil Release/Offset |
|---|---|---|---|---|---|
| E1 | 20.9 | 1.9 | 2.0 | 1/2 | 1/1 |
| E2 | 16.2 | 3.4 | 2.5 | 1/2 | 1/1 |
| E3 | 13.9 | 5.0 | 3.6 | 1/2 | 1/1 |
| CE1 | 31.5 | 1.7 | 4.2 | 1/1 | 1/1 |
| CE2 | 27.7 | 3.0 | 4.0 | 1/2 | 1/1 |
| CE3 | 22.7 | 4.0 | 4.8 | 1/2 | 1/1 |
| CE4 | 19.0 | 6.7 | 5.5 | 1/2 | 1/1 |
| CE5 | 23.4 | 2.5 | 4.0 | 1/2 | 1/1 |
| CE6 | 19.4 | 3.5 | 4.4 | 1/2 | 1/1 |
| CE7 | 18.4 | 7.5 | 7.2 | 1/2 | 1/1 |
| CE8 | 33.2 | 5.9 | 8.0 | 1/2 | 1/1 |

Advantages

The examples and comparative example demonstrate that incorporation of a silicone T-resin and an aryl silane crosslinking agent decrease the oil swell and improve the wear resistance of the materials comparing the oil swollen wear to the dry wear. Further it was demonstrated that superior toner release properties were obtained.

The invention has been described with particular reference to preferred embodiments thereof but it will be understood that variations and modifications can be effected within the spirit and scope of the invention.

PARTS LIST 8 fusing assembly
10 fusing member
12 fuser roller
14 metallic core
16 outer layer
18 cushion layer
20 intermediate layer
22 pressure roller
30 nip
40 unfused toner
42 receiver sheet
44 heating lamp
46 control circuit
48 heating lamp

What is claimed is:

1. A fuser member having a support metallic core and an outer layer of material formed over the metallic core, the outer layer including composite material, comprising:
   (a) a silicone T-resin
   (b) a crosslinkable poly(dialkylsiloxane) having hydroxy end groups, wherein the poly(dialkylsiloxane) has a weight average molecular weight before crosslinking of about 5,000 to 80,000; and
   (c) an aryl silane crosslinking agent having, a functional group which reacts with the hydroxy group.

2. The fuser member of claim 1 wherein the crosslinkable poly(dialkylsiloxane) includes poly(dimethylsiloxane).

3. A fuser member having a support metallic core and an outer layer of material formed over the metallic core, the outer layer including composite material, comprising:
   (a) a silicone T-resin;
   (b) a crosslinkable poly(dialkylsiloxane) having hydroxy end groups, wherein the poly(dialkylsiloxane) has a weight average molecular weight before crosslinking of about 5,000 to 80,000; and
   (c) an aryl silane crosslinking agent having a functional group which reacts with the hydroxy group of the general formula $R^1{}_n Si(OR^2)_{4-n}$;

$R^1{}_n R^3{}_m Si(OR^2)_{4-n-m}$;

Or $R^1{}_n Si X_{4-n}$ where $R^1$ is aryl and $R^2$ and $R^3$ are independently aryl or alkyl, X is a halide or hydrogen, n and m are integers such that their sum is from 1 to 4.

4. The fuser member of claim 3 wherein the crosslinkable poly(dialkylsiloxane) includes poly(dimethylsiloxane).

5. The fuser member according to claim 3, wherein the crosslinkable, filled, poly(dialkylsiloxane) includes an (α-ω-hydroxy-) poly(dialkylsiloxane) having a weight average molecular weight before crosslinking of about 5,000 to 80,000 with the general structure

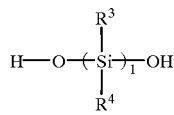

where 1 is an integer, $R^3$ and $R^4$ are independently alkyl groups selected from the group consisting of methyl, ethyl, propyl, butyl, pentyl, and hexyl.

6. A fuser member having a support metallic core and an outer layer of material formed over the metallic core, the outer layer including composite material, comprising:
   (a) a silicone T-resin is a crosslinked material with the empirical formula $RSiO_{1.5}$ with by nature an unordered structure wherein R is an alkyl or aryl group;
   (b) a crosslinkable poly (dialkylsiloxane) having hydroxy end groups wherein the poly(dialkylsiloxane) has a weight average molecular weight before crosslinking of about 5,000 to 80,000; and
   (c) a aryl silane crosslinking agent.

7. The fuser member of claim 6 wherein the crosslinkable poly(dialkylsiloxane) includes poly(dimethylsiloxane).

8. The fuser member according to claim 6 wherein the silicone T-resin includes an amount from 26 to 100 parts by weight of silicone T-resin per 100 parts of crosslinkable poly(dialkylsiloxane).

9. The fuser member according to claim 6 wherein aryl silane crosslinking agent is present in an amount of from about 5 to 50 parts by weight per 100 parts of crosslinkable poly(dialkylsiloxane).

10. The fuser member according to claim 6 wherein the fuser member is a fuser roller or a pressure roller.

11. The fuser member according to claim 6 further including an oil barrier layer disposed between the support metallic core and the outer layer.

12. The fuser member according to claim 11 further including a cushion layer disposed between the oil barrier layer and the support metallic core.

13. The fuser member according to claim 6 further including a cushion layer disposed between the support metallic core and the outer layer.

* * * * *